(Model.)

G. E. WILSON.
THILL COUPLING.

No. 254,894. Patented Mar. 14, 1882.

Witnesses:
Perry B. Turpin
F. W. Wheat

Inventor
George E. Wilson
By R. S. & A. P. Lacey
Attys.

UNITED STATES PATENT OFFICE.

GEORGE E. WILSON, OF MORRISTOWN, ASSIGNOR OF ONE-HALF TO AUSTIN D. TAYLOR, OF BELMONT COUNTY, OHIO.

THILL-COUPLING.

SPECIFICATION forming part of Letters Patent No. 254,894, dated March 14, 1882.

Application filed December 30, 1861. (Model.)

*To all whom it may concern:*

Be it known that I, GEORGE E. WILSON, a citizen of the United States, residing at Morristown, in the county of Belmont and State of Ohio, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in thill-couplings; and it consists in the construction and arrangement of the several parts, as will be hereinafter more fully described, and specifically pointed out in the claims.

Figure 1:
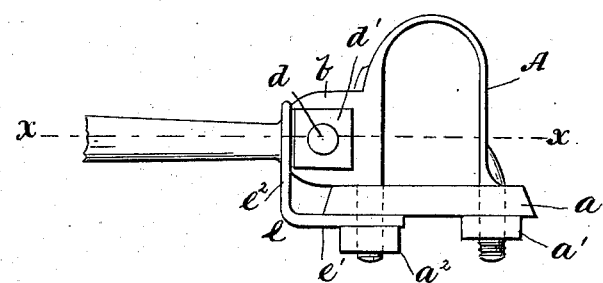
Figure 2:
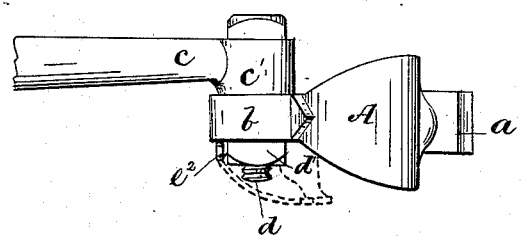
Figure 3:
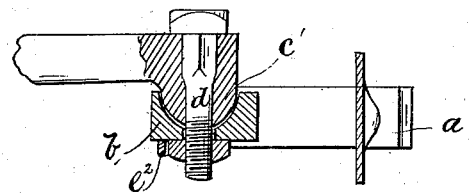
Figure 4:
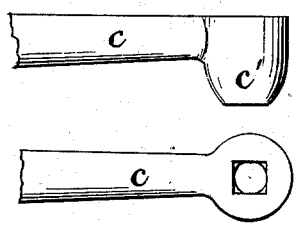
Figure 5:
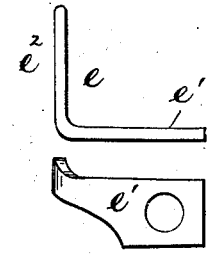

In the drawings, Figure 1 is a side view; Fig. 2, a plan; Fig. 3, a longitudinal section on line $x \, x$, Fig. 1; and Figs. 4 and 5 show details of a coupling constructed according to my invention.

A represents the clip, which may be secured to the axle in any ordinary manner desired. $a$ is the bottom plate, which is provided with openings through which are passed the ends of arms of clips, which are threaded, as shown. $a' \, a^2$ are nuts placed on ends of side bars of clip. The nut $a'$ is screwed directly up against the plate $a$, while the nut $a^2$ is screwed up against the L-bar, hereinafter described, and secures the latter between the nut and the plate $a$, as shown.

$b$ is a lug extended horizontally forward from the clip A. This lug has formed through it an opening, and its inner side, around the mouth of the opening, is countersunk, as shown, to receive the chamfered end of side extension or bend of coupler $c$, hereinafter described.

$c$ is the coupler, to which the shafts may be connected in any suitable manner. Its rear end is provided with the side extension, $c'$, the end of which extension is chamfered and rested in the countersink of lug $b$, as shown in Fig. 3, when it is secured by pivotal bolt, hereinafter described. Through the end and side extension of coupler is formed an opening, the forward part of which I make angular, as shown.

$d$ is the pivotal bolt, the shank of which, next the head, is made angular to fit the angular portion of opening through coupler $c$, and its opposite end is threaded to receive the nut $d'$, which screws down against the outer side of lug $b$ and secures the coupler and lug on clip firmly together. By the angular form of the opening through coupler and correspondingly angular portion of pivot-bolt $d$ it will be seen that the clip and coupler can only be disconnected by unscrewing the nut $d'$.

$e$ is an L lock-bar, composed of the arms $e'$ $e^2$. The arm $e'$ is provided with an opening fitted to pass up over the threaded end of forward arm of clip, where it is secured by nut $a^2$, between the latter and the plate $a$, as shown. The arm $e^2$ is bent upward and resting against the side of nut $d^2$, and locks and prevents the same from turning when the arm $e'$ is held by nut $a^2$, as shown in Figs. 1, 2, and 3.

When desired for any purpose to uncouple the shafts, the nut $a^2$ may be loosened, when the arm $e^2$ can be swung outwardly, as shown in dotted lines, Fig. 2, and the nut $d'$ can be unscrewed and the parts separated as desired.

It may sometimes be advantageous to have the opening through arm $e'$ of L-bar $e$ made elongated, so that the arm $e^2$ can be set flush up against side of nut $d'$, or slightly away from the side of same, as circumstances may require.

Having thus described my invention, what I claim, and desire to secure by Letters Patent, is—

1. The combination, with the clip and bolt for holding the thill to the axle, of a lock-bar pivoted and turning laterally to and from the jaw of the clip and against the edge of the nut on the end of the bolt which holds the thill to the clip, substantially as set forth.

2. The combination, with the clip and bolt for holding the thill to the axle, of an L-shaped lock-bar having its end $e'$ fixed and turning on the under end of the bolt which holds the clip to the axle, and turning laterally to and from the jaw, and having its end $e^2$ arranged to turn in against the jaw and close to the edge of and lock the nut on the end of the bolt which holds the thill to the clip, substantially as set forth.

In testimony whereof I affix my signature in presence of two witnesses.

GEORGE E. WILSON.

Witnesses:
C. C. METCALF,
GEORGE F. MCKISSON.